M. C. BOGIA.

Machines for Removing Snow and Ice from Roadways.

No. 5,697. Reissued Dec. 23, 1873.

Witnesses:
A. W. Almqvist
A. Seidquick

Inventor:
M. C. Bogia
Per Munn & Co.
Attorneys.

UNITED STATES PATENT OFFICE.

MATTHEW C. BOGIA, OF PHILADELPHIA, PENNSYLVANIA.

IMPROVEMENT IN MACHINES FOR REMOVING SNOW AND ICE FROM ROADWAYS.

Specification forming part of Letters Patent No. 37,897, dated March 17, 1863; reissue No. 5,697, dated December 23, 1873; application filed November 15, 1873.

*To all whom it may concern:*

Be it known that I, MATTHEW C. BOGIA, of Philadelphia, in the county of Philadelphia and State of Pennsylvania, have invented a new and Improved Apparatus for Removing Snow and Ice from Roadways, of which the following is a specification:

My invention consists of a fire-chamber arranged on a suitable truck and means so operating as to discharge onto the rails or surface of a track a blast of such a heat that the snow or ice which may have accumulated on the rails or track will be rapidly melted.

In order to enable others to make and use my invention, I will now proceed to describe its construction and operation.

Figure 1:
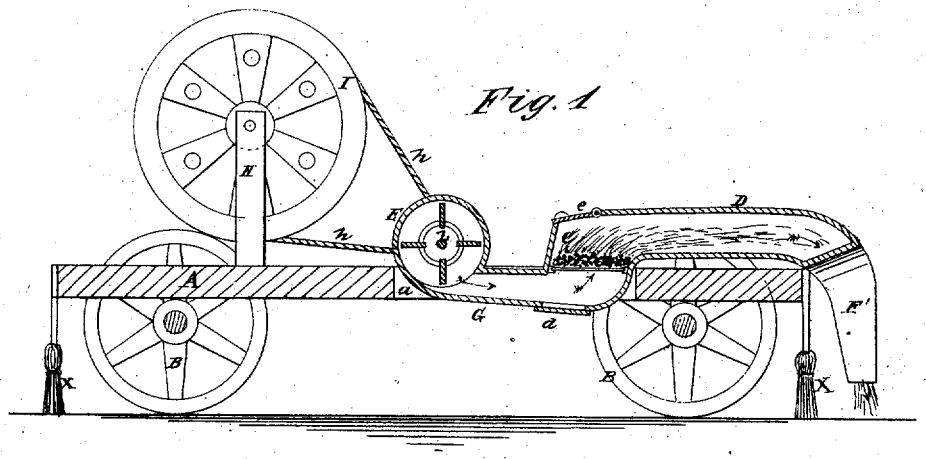
Figure 2:
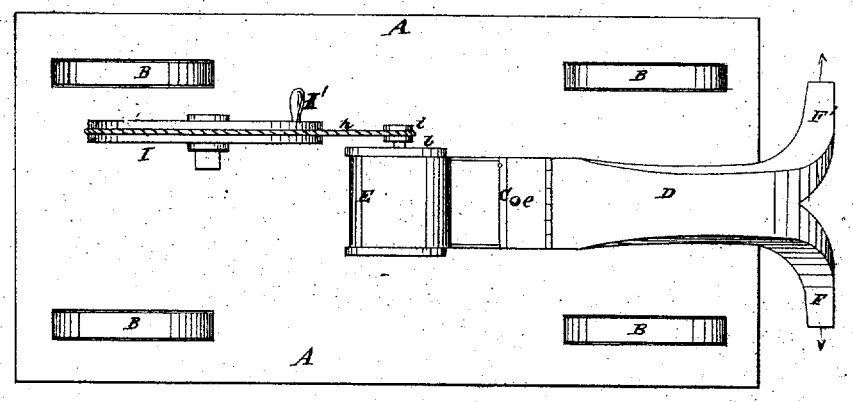
Figure 3:
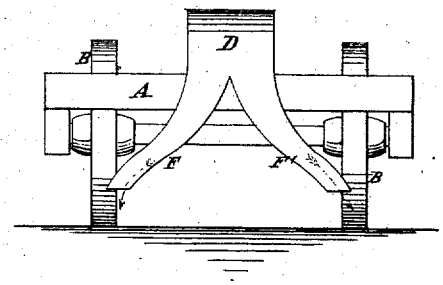

On reference to the accompanying drawing, which forms a part of this specification, Figure 1 is a sectional elevation of my apparatus for removing snow and ice from roadways. Fig. 2 is a plan view, and Fig. 3 a front view. Similar letters of reference indicate corresponding parts.

A is a truck supported on wheels B B, which may be either plain or flanged, and adapted to city railway-tracks. A portion of the truck near the center is removed, leaving the opening *a*, in the forward end of which is situated the fire-chamber C, communicating with a horizontal flue, D, which projects over the front of the truck, where it is bifurcated—if specially for railways—and formed into two pipes or tubes, F and F′, which project downward, and terminate at a point above, or adjacent to, the rails of the track. At the rear of the fire-box C is a blower, E, in which revolves the spindle *b*. G is a pipe, forming a communication between the blower and the space beneath the grate *c* of the fire-chamber. The under side of the pipe G, beneath the fire-chamber, has a hinged door, *d*, and the top of the fire-chamber is furnished with a similar hinged door or lid, *e*. At the rear of the blower E, and on the truck, is an upright, H, on which turns the driving-wheel I, a belt or band from the latter passing round a pulley, *i*, on the spindle *b* of the blower, and the wheel being furnished with a suitable handle, I′.

The fuel having been introduced through the opening in the top of the fire-chamber, and properly ignited, the apparatus is ready for being drawn over the track, from which the snow and ice has to be removed.

As the truck traverses the roadway, the necessary rotary motion is imparted to the blower, so that the sparks, smoke, and other heated products of combustion will be forced through the flue D, and through the pipes F onto the rails of the track or the surface of the roadway. Under the influence of this heat, the snow and ice on and near the rails or roadway will be quickly melted, and caused to flow away.

The lower ends of the pipes F may be so formed as to project forward and act as plows to partially remove deep snow from the track, the snow and ice remaining on the rails being melted by the hot blast.

The blower may be driven from the wheels of the truck by a suitable system of gearing or pulleys and bands, or a small engine may be erected on the truck for the purpose of driving the blower.

Brushes (shown at *x*, Fig. 1) may be used to sweep from the rails any partially-melted snow or ice which may remain on the same.

Having thus described my invention, I claim as new and desire to secure by Letters Patent—

1. The method of clearing roadways from snow and ice by a portable furnace adapted to move along the roadway and to discharge the heat upon the snow and ice, thereby melting them and causing them to flow away as water, substantially as set forth.

2. The combination of a truck, a heat-generator, and a blower, as and for the purpose specified.

MATTHEW C. BOGIA.

Witnesses:

JOHN A. WIEDERSHEIM,

A. P. GRANT.